United States Patent
Hayes

(10) Patent No.: US 12,018,201 B2
(45) Date of Patent: Jun. 25, 2024

(54) OIL IN WATER WAX EMULSION COMPOSITION

(71) Applicant: Crystal, Inc.—PMC, Lansdale, PA (US)

(72) Inventor: John Hayes, Bensalem, PA (US)

(73) Assignee: Crystal, Inc.—PMC, Lansdale, PA (US)

( * ) Notice: Subject to any disclaimer, the term of this patent is extended or adjusted under 35 U.S.C. 154(b) by 0 days.

(21) Appl. No.: 17/587,909

(22) Filed: Jan. 28, 2022

(65) Prior Publication Data

US 2022/0235274 A1    Jul. 28, 2022

Related U.S. Application Data

(60) Provisional application No. 63/142,564, filed on Jan. 28, 2021.

(51) Int. Cl.
| | | |
|---|---|---|
| *C09D 5/02* | (2006.01) |
| *C09D 7/45* | (2018.01) |
| *C09D 7/61* | (2018.01) |
| *C09D 7/65* | (2018.01) |
| *C09D 191/06* | (2006.01) |
| *C09K 23/42* | (2022.01) |

(52) U.S. Cl.
CPC .............. *C09K 23/42* (2022.01); *C09D 5/022* (2013.01); *C09D 7/45* (2018.01); *C09D 7/61* (2018.01); *C09D 7/65* (2018.01); *C09D 191/06* (2013.01)

(58) Field of Classification Search
CPC .............................. C09D 5/022; C09D 191/06
See application file for complete search history.

(56) References Cited

U.S. PATENT DOCUMENTS

| | | | |
|---|---|---|---|
| 9,447,279 B2 * | 9/2016 | Herrlich | ................ C11C 3/006 |
| 2010/0048442 A1 | 2/2010 | Kawano et al. | |
| 2015/0283062 A1 | 10/2015 | Ilekti et al. | |
| 2018/0028435 A1 | 2/2018 | Punsch et al. | |

FOREIGN PATENT DOCUMENTS

| | | | |
|---|---|---|---|
| HU | 210055 B | * | 1/1995 |
| JP | 2009019023 | | 1/2009 |
| JP | 2018123117 | | 8/2018 |

OTHER PUBLICATIONS

International Search Report and Written Opinion for International Application No. PCT/US2022/014390 (May 13, 2022).

* cited by examiner

*Primary Examiner* — Vickey Nerangis
(74) *Attorney, Agent, or Firm* — Stone Pigman Walther Wittmann, L.L.C.; Mackenzie D. Rodriguez

(57) ABSTRACT

The present invention relates to compositions in the form of an oil-in-water emulsion preferably comprising an aqueous phase, a natural wax, at least two surfactants, and a neutralizing agent.

15 Claims, No Drawings

OIL IN WATER WAX EMULSION COMPOSITION

CROSS-REFERENCE TO RELATED APPLICATIONS

This application claims the benefit of U.S. Provisional Patent No. 63/142,564, filed 28 Jan. 2021, which is incorporated herein by reference. Priority of U.S. Provisional Patent No. 63/142,564, filed 28 Jan. 2021 is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a composition in the form of an oil-in-water natural wax emulsion.

2. General Background of the Invention

Oil-in-water wax emulsions have been used in a variety of applications and industries including and not limited to paper coating, textiles, explosives, fruit & vegetable coatings, pharmaceuticals, candles, moulded novelties, electric insulation, textile and leather sizing, waterproofing, carbon paper, typewriter ribbons, printing inks, lubricants, crayons, adhesives, chewing gum and cosmetics. Typically, these types of emulsions are used either as a standalone or as an active ingredient in formulations in the mentioned applications. In looking at these oil-in-water emulsions, different types of waxes are considered, and various issues are associated with the different formulations.

A wax is a substance consisting of hydrocarbons or esters of fatty acids that are insoluble in water and soluble in non-polar organic solvents.

Wax emulsions have been used in many different applications and are preferred in formulating in certain applications due to the aqueous phase and ease of formulation. This invention addresses the issue of creating a high solids oil-in-water emulsion that would be phase stable that would have some physical attributes and meet certain regulatory compliances that are commercially favorable. The present invention is able to achieve a higher solids oil-in-water emulsion that is stable at both room temperature and elevated temperatures (for example, 50° C.), pH of 7-10 (typical for pH to be 8-8.5), viscosity range of 1-10,000 centipoise (cps) (it is around 200-5000 cps with solids influencing the viscosity), good hand shear, contact angle with water being over 90° with no staining, and sebum contact angle over 90° with no staining.

Waxes from different various starting materials or sources are considered in formulating oil-in-water emulsions. The present invention focuses on natural waxes (examples include white beeswax, yellow beeswax, cetyl palmitate, carnauba wax, and rice bran wax) and more specifically, focuses on rice bran wax (RBX). Rice bran wax is extracted from the bran oil of rice where the main components are aliphatic acids and higher alcohol esters. The aliphatic acids consist of palmitic acid (C16), behenic acid (C22), lignoceric acid (C24), and other higher wax acids while the higher alcohol esters consist mainly of ceryl alcohol (C26) and melissyl alcohol (C30). Rice bran wax will also contain constituents such as free fatty acids (palmitic acid), squalene and phospholipids. Natural waxes typically have a melting point of 77° C.-86° C. and are an off white to moderate orange/brown in color.

Rice bran wax can be used in multiple applications and is great for use in water proofing materials, emollients, and as an exfoliant basis material. Additionally, it can produce a hard coating. These properties can be particularly useful and desired in personal care applications and in the construction and building industries. The main deterrent in using the rice bran wax in an oil-in-water emulsion is that the ability to incorporate a high percentage of rice bran wax into oil-in-water emulsion compositions is difficult. The oil-in-water emulsion has to be flowable and the tendency of the rice bran wax is to thicken the emulsion considerably and possibly solidify the emulsion. Additional deterrents to using rice bran wax in an oil-in-water emulsion are the inability to make a stable emulsion at higher concentration due to the hydrophobic nature of rice bran wax and the inability to create stable droplets or micelles.

U.S. Pat. No. 9,283,173 discloses uses for an oil-in-water emulsion with beeswax, lanolin wax, Chinese insect waxes, rice wax, carnauba wax, candelilla wax, ouricury wax, esparto wax, cork fibre wax, sugarcane wax, Japan wax, sumac wax, montan wax, microcrystalline waxes, paraffin waxes and ozokerite; polyethylene waxes, and waxes obtained by the Fischer-Tropsch process being emulsified by fatty acids. U.S. Pat. No. 9,283,173 provides the following background information on wax-containing emulsions and emulsifying agents.

> "Various kinds of wax-containing emulsions and emulsifying agents have been proposed, many targeted to specific cosmetic applications. For example, U.S. Pat. No. 4,507,279 discloses cosmetic composition of the oil-in-water type comprising an oily substance having no free carboxyl group including, inter alia, beeswax and carnauba wax, water, and an emulsifier composed of either a combination of a basic polypeptide and a higher fatty acid or a salt (soap) formed from these compounds.
> 
> U.S. Pat. No. 6,264,965 discloses a creamy composition in the form of an oil-in-water emulsion comprising an oily phase dispersed in an aqueous phase, characterized in that it contains at least one anionic emulsifier which is liquid at room temperature, and at least 5% by weight of one or more waxes relative to the total weight of the composition, and in that the oily phase is in the form of a soft paste at room temperature. The anionic emulsifier is preferably a surfactant containing a phosphate group, such as octyldecyl phosphate. A process for preparing this composition, characterized in that at least one step of the process is carried out using a mixer-extruder and uses of the composition in cosmetics and dermatology is also disclosed.
> 
> Compact powders for use in cosmetic, pharmaceutical, or food compositions are typically anhydrous compositions which may mainly be composed of solid particles and of a fatty binder, shaped by compression. Use of derivatives of basic amino acids, including lysine, have been proposed for modifying the surface of inorganic substance present in such compositions and for increasing the dispersibility of the compositions (e.g., U.S. Pat. Nos. 4,640,943; 5,688,527; 5,688,527).

U.S. Application Publication No. 2008/0124292, published after the priority date of the present application, discloses compositions useful for coating the eyelashes that address the problem of homogenous dispersion of pigments and waxes in mascara compositions. The compositions of that application contain an aqueous phase and an emulsifying system that comprises at least one specific amino acid compound, including basic amino acids, glutamic acid, sarcosine, and glycine.

Individuals typically suffer from various skin ailments that may result from environmental factors, age, wounding, and exposure to chemicals as well as from inflammatory and allergic responses of the skin.

Many attempts have been made to treat these skin conditions. A multi-billion-dollar industry comprising hundreds of companies world-wide, produce and supply thousands of different types of creams, salves, balms, ointments and medicaments for healing the skin.

The following are several examples of ointments intended for treatment of the skin. U.S. Pat. No. 4,355,046 discloses a treatment method that moisturizes the skin with a cream containing specially formulated petrolatum, a siloxane solvent, and a microcrystalline wax. U.S. Pat. No. 4,880,627 discloses a skin treatment mixture, comprising a combination of natural ingredient—an extract of the Eupatorium plant, with the chemical ingredients sulfathiazole, petrolatum and zinc oxide"

U.S. Pat. No. 6,375,942 discloses a skin healing ointment comprising a base containing petrolatum, beeswax or other wax, and antibiotic ingredient. These basic ingredients can be combined with zinc oxide and an anti-itch ingredient for universal applicability to, and effective treatment of, various skin disorders.

Some of the attempts were directed to the use of stimulants or certain inhibitors. As an example, collagen stimulation was used for skin treatment (Schiltz, John, et ah, J Invest Dermatol 87:663-667).

U.S. Pat. No. 6,419,936 related to a topical skin ointment for application onto the skin of individuals suffering from minor skin irritations such as dry chapped skin, minor cuts, scrapes, and abrasions. The topical skin ointment includes ingredients intended to reduce the discomfort associated with these types of skin irritations as well ingredients intended to promote the natural healing process including vitamins and zinc oxide"

It continues to be desirable and advantageous to develop a new and improved solution to creating an oil-in-water emulsion because higher solids emulsions make for better consistency.

Soleimanian, et al. provides an overview of wax-based delivery systems and provides some background information of wax delivery systems and uses of wax-based emulsion by water-in-oil emulsion. Yasamin Soleimanian, Sayed Amir Hossein Goli, Atefe Shirvani, Ameneh Elmizadeh, Alejandro G. Marangoni 29 Aug. 2020 Wax☐based delivery systems: Preparation, characterization, and food applications, *Comprehensive Reviews in Food Science and Food Safety Volume* 19, *Issue* 6 (available at https://doi.org/10.1111/1541-4337.12614).

Wijarnprecha, et al. describes using Rice Bran wax (RBX) oleogels and glycerol monostearate (GMS) to stabilize a water-in-oil emulsion. Khakhanang Wijarnprecha, Auke de Vries, Pravit Santiwattana, Sopark Sonwai, Derick Rousseau, Microstructure and rheology of oleogel-stabilized water-in-oil emulsions containing crystal-stabilized droplets as active fillers, LWT, Volume 115, 2019, 108058, ISSN 0023-6438 (available at https://doi.org/10.1016/j.1 wt.2019.04.059). Water disrupts the stability of an oil in water emulsion. Unlike the present invention, Wijarnprecha, et al. solves this problem by using the water as a filler and not as the medium phase. However, this completely changes the rheological properties and microstructure by going to a water-in-oil emulsion.

Conversely, in Khakhanang Wijarnprecha, Auke de Vries, Pravit Santiwattana, Sopark Sonwai, Dérick Rousseau, Rheology and structure of oleo gelled water-in-oil emulsions containing dispersed aqueous droplets as inactive fillers, LWT, Volume 115, 2019, 108067, ISSN 0023-6438, https://doi.org/10.1016/j.1 wt.2019.04.068, describes a similar water-in-oil emulsion that uses the water as a filler and not as a medium. This highlights the stability issues of a rice bran wax emulsion in an oil-in-water emulsion state by going to a water-in-oil version of the emulsion.

US Patent Publication No. 2016/0000665 describes an oil-in-water emulsion that is in a continuous aqueous phase with the oily phase dispersed with at least one hydrocarbon-based oil comprising 1%-10% of a wax with a melting point of greater than 45° C. (113° F.), one or more C40-C70 ester compounds and not any C20-C39 ester compounds, a non-ionic surfactant with 16 carbon atoms that is not a fatty alcohol, a fatty alcohol containing at least 16 carbon atoms, a water soluble polysaccharide, and a hydrocarbon-based oil. The emulsifier package and range of wax being used in the present invention is distinct from that disclosed in US Patent Publication No. 2016/0000665 in that it has a much higher percentage of wax (25-60% wax versus 1-10% wax). Additionally, the primary surfactant used in the '665 Publication is non-ionic, containing 16 carbon atoms, water soluble polysaccharide and hydrocarbon-based oil. Conversely the present invention uses a non-ionic surfactant with 80-84 carbons (or 39-41 moles of epoxylation), a surfactant that is linear epoxylated, and polyethylene glycol to emulsify. Furthermore, the present invention does not use a hydrocarbon-based oil; the only oil in the present invention comes from the rice bran wax itself.

U.S. Pat. No. 9,828,504 describes the use of an oil-in-water emulsion containing paraffin, montan, carnauba, sunflower, rice, tallow or a wax containing organic acids or esters emulsified by either polyethylene glycol, methoxypolyethylene glycol, or polyvinyl alcohol in joint compound for water resistance.

The following U.S. Patents and Publications are incorporated herein by reference: U.S. Pat. Nos. 9,283,173; 9,828,504; 2016/0000665.

SUMMARY OF THE INVENTION

The present invention relates to compositions in the form of an oil-in-water emulsion comprising a solids portion and an aqueous phase, and an emulsifying package. Preferably, the solids portion comprises a wax. Preferably, the wax is a natural wax, most preferably rice bran wax (*Oryza sativa* Bran Wax). Preferably, the emulsifying package comprises an alcohol ether of ethylene oxide propylene oxide surfactant or polyethylene glycol, preferably with a molecular weight of up to 10,000 Daltons, more preferably 50-10,000 Daltons, even more preferably 100-5,000 Daltons, and most preferably 150-500 Daltons with average of 300 Daltons, a secondary alcohol ethoxylate, and an alkaline or neutralizing agent.

Preferably, the aqueous phase is a continuous aqueous phase that is opaque wherein the solids portion preferably consists of 30%-65% by weight of the oil-in-water emulsion.

Preferably, the wax has a melting point higher than 45° C. (113° F.). Preferably, the wax is a natural wax which is a long chain ester with phospholipids and free fatty acids and alcohols. Preferably, the wax consists of 25-65% by weight relative to the oil-in-water emulsion.

In a more preferred embodiment, the emulsion of the present invention includes a wax that is naturally derived, from renewable resources, and has a melting point between 49-100° C. Preferably, the wax has an iodine value (IV) under 20 g/100 g, maximum acid value of 13 KOH/g and saponification value of above 20 mg KOH/g. More preferably, the saponification value is 70-120 mg KOH/g. The saponification value, or number, represents the quantity, in milligrams of KOH which react with one gram of wax under elevated temperatures, and indicates the amount of free carboxylic acid plus any esters which may be saponified. This value, and the acid number, described, provide an indication of the free carboxylic acid and ester content of the wax. See https://www.sciencedirect.com/topics/engineering/saponification-value. The acid number is defined as the number of grams KOH needed to neutralize 1 gram of resin (the wax) under fixed conditions. See https://www.sciencedirect.com/topics/chemistry/acid-number #:~:text=The %20acid %20number %20is %20defined,and %20for %20phenol %2Dmodified %20resins)

In one or more embodiments, the emulsifying package comprises at least two nonionic surfactants.

Preferably, one of the at least two surfactants is an alcohol ether of ethylene oxide propylene oxide surfactant which contains saturated C8-C18 carbon chains with moles of ethoxylated and propoxylated chains.

Preferably, one of the at least two surfactants is an alcohol ether of ethylene oxide propylene oxide surfactant which contains saturated C8-C10 carbon chains with moles of ethoxylated and propoxylated chains Preferably, the alcohol ether of ethylene oxide propylene oxide surfactant is comprised of 0.5% to 5.0% by weight of the oil-in-water emulsion.

Preferably, the secondary alcohol ethoxylate contains a secondary chain whose approximately length is 30-60 moles of ethylene oxide. More preferably, the secondary alcohol ethoxylate contains a secondary chain whose length is approximately 40 moles of ethylene oxide. Preferably, the secondary alcohol is comprised of 0.5%-5% by weight of the oil-in-water emulsion.

The neutralizing agent is any agent to neutralize the free fatty acids and alcohols. Preferably, sufficient neutralizing agent is used to achieve a pH range of 7-10.5. In a preferred embodiment, the neutralizing agent can be a base which includes one or more from the following group: potassium hydroxide, sodium hydroxide, and amines such as ammonia, ethyl amines, ethanolamine, isopropylamines, and other amine derivatives. Preferably, the neutralizing agent of the composition is in a weight amount of 0.25%-5% of the oil-in-water emulsion. Preferably, the neutralizing agent is ammonium hydroxide (30% ammonium hydroxide) in the weight amount of 0.1%-10%, more preferably 2.0-4.0%, of the oil-in-water emulsion. Any alkaline agent which can be effective to achieve a pH range of 7-10.5 can be used as the neutralizing agent. Preferably, the alkaline agent is added in such a quantity sufficient to result in a pH of 7-10.5.

The oil-in-water emulsion process is a multi-step process. The water, emulsifier package, and neutralizing agent is mixed and heated between 180° F.-210° F. (82° C.-100° C.), or at least 5-10° C. (9-18° F.) above the melting point of the wax. The wax is blended in with the heating pre-emulsion. The mixture maintains a desired temperature until fully blended and is dispersed as a blended aqueous mixture. In a preferred embodiment, the mixture is homogenized in a homogenizer, preferably at 1000-3000 pounds per square inch (psi) (6.9-20.7 Megapascals (MPa)).

In a preferred embodiment, a method of preparing any of the aforementioned compositions is provided.

In a preferred embodiment, a method for preparing an oil-in-water composition comprises the following steps:
 (a) mixing the solids, aqueous phase, emulsifier package, and neutralizing agent;
 (b) heating the mixture of step (a) to above a melting point of wax of step (c);
 (c) blending the heated mixture of step (b) with a wax, pre-emulsion, to form a new mixture;
 (d) maintaining the temperature of the mixture of step (c) until the mixture is fully blended and is dispersed as a blended aqueous mixture.

In one or more embodiments, the method further comprises homogenizing the blended aqueous mixture of step (d). The homogenization can be done in a homogenizer at 1000-3000 psi (6.9-20.7 Mpa).

In one or more embodiments, the wax is a natural wax.

In one or more embodiments, the wax is a naturally derived. Preferably the wax is from a renewable resource. Preferably, the wax has a melting point between 49-100 degrees C. and saponification value of above 20 mg KOH/g.

In one or more embodiments, the wax has a saponification value of 70-120 mg KOH/g.

In one or more embodiments, the wax is *Oryza sativa* Bran Wax (rice bran wax).

In one or more embodiments, the emulsifying package comprises at least two nonionic surfactants. The emulsifying package can comprise an alcohol ether, polyethylene glycol (PEG), and a secondary alcohol ethoxylate. The alcohol ether can be an alcohol ether of ethylene oxide propylene oxide surfactant. The PEG can have a molecular weight of 50-10,000 Daltons, preferably 100-5,000 Daltons, most preferably 150-500 Daltons with an average molecular weight of 300 Daltons.

In one or more embodiments, the aqueous phase is a continuous aqueous phase that is opaque.

In one or more embodiments, the solids comprise 30%-65% by weight of the oil-in-water emulsion.

In one or more embodiments, the wax has a melting point higher than 45° C.

In one or more embodiments, the wax has a melting point between 49° C. and 100° C.

In one or more embodiments, the wax is a natural wax that is a long chain ester with phospholipids and free fatty acids and alcohols.

In one or more embodiments, the wax consists of 40-60% by weight relative to the oil-in-water emulsion.

In one or more embodiments, one of the two surfactants is an alcohol ether of ethylene oxide propylene oxide surfactant which contains saturated C8-C18 carbon chains with moles of ethoxylated and propoxylated chains.

In one or more embodiments, one of the two surfactants is an alcohol ether of ethylene oxide propylene oxide surfactant which contains saturated C8-C10 carbon chains with moles of ethoxylated and propoxylated chains.

In one or more embodiments, the alcohol ether of ethylene oxide propylene oxide surfactant is comprised of 0.5% to 5.0% by weight of the oil-in-water emulsion.

In one or more embodiments, the secondary alcohol ethoxylate contains a secondary chain whose length is approximately 3-60 moles of ethylene oxide.

In one or more embodiments, the secondary alcohol ethoxylate contains a secondary chain whose length is approximately 40 moles of ethylene oxide.

In one or more embodiments, secondary alcohol is comprised of 0.5%-5% by weight of the oil-in-water emulsion.

In one or more embodiments, the wax comprises free fatty acids and alcohols and the neutralizing agent is any agent to neutralize the free fatty acids and alcohols.

In one or more embodiments, the neutralizing agent is comprised of ammonium hydroxide in a weight amount of 0.1-10% of the oil-in-water emulsion.

In one or more embodiments, the neutralizing agent is comprised of 30% ammonium hydroxide in a weight amount of 0.1-10% of the oil-in-water emulsion.

In one or more embodiments, the neutralizing agent is an alkaline agent.

In one or more embodiments, the alkaline agent is added in a quantity sufficient to result in a pH of 7-10.5.

In one or more embodiments, in step (b) above, the mixture is heated to 5° C.-10° C. (9° F.-18° F.) above the melting temperature of the wax of step (c).

In one or more embodiments, in step (b) above, the mixture is heated to 180° F.-210° F. (82° C.-99° C.).

DETAILED DESCRIPTION OF THE INVENTION

Wax emulsions have been used in many different applications and are preferred in formulating in certain applications due to the aqueous phase and ease of formulation. This invention addresses the issue of creating a high solids oil-in-water emulsion that would be phase stable while still retaining desirable physical attributes and maintaining regulatory compliance. Desirable physical attributes may include water resistance, a viscosity in the range of 1-10,000 centipoise (cps), sebum resistance, pH range of 7-10, smooth coating, and shear stability. Additionally, the present invention can meet compliance requirements in several countries for indirect and direct food contact, board coating applications, and personal care regulations, which may include Code of Federal Regulations (CFR) compliances for the United States, Guo Bio (GB) compliances in China, REACH regulations in the European Union, and other regulatory regulations which are known to those with skill in the art.

A preferred composition can be found in the below Table:

| Component | Alternatives | Range | Preferred |
| --- | --- | --- | --- |
| Rice Bran Wax (RBX) | Naturally derived wax | 40%-50% | 45% |
| Polyethylene glycol (PEG) | | 0%-3% | 3% |
| Pareth-40 | secondary alcohol | 0%-5% | 3% |
| Alcohol ether of ethylene oxide propylene oxide surfactant | Ethoxylated propoxylated surfactant | 0.5%-1.5% | 1% |
| Ammonium Hydroxide | Neutralizing Agent | 0.5%-1% | 0.81% |
| Water | None | 59%-39.5% | 47.19% |

This emulsion is preferably formulated by blending the water and emulsifier package and then heating the solution to 190° F. (88° C.). Then ammonium hydroxide is added while the formulation is heated in a hood. Once the formulation is at approximately 190° F. (88° C.) the rice bran wax is added. The formulation is preferably mixed for approximately an hour between 190° F.-200° F. (88° C.-94° C.) to allow the rice bran wax to melt and to emulsify. After the formulation has been fully blended and is in a homogenous phase for an hour, the formulation is then homogenized at 2000 psi (13.8 Mpa) in a homogenizer. After homogenization, the emulsion is cooled to room temperature and filtered through a 300-micron filter.

The emulsifier package preferably comprises PEG and Ethoxylated or alcohol surfactant. In a preferred embodiment, the alcohol surfactant is a Pareth surfactant in which the Pareth-40 is preferred. In a more preferred embodiment, the emulsifier package further comprises the ethoxylated propoxylated surfactant. Other known emulsifier packages that are suitable for use with higher wax solids could be used, such as one comprising a fatty alcohol, linear surfactant and polysaccharide; however, the emulsifier package of the present invention displays increased stability of the higher wax emulsion.

In some preferred embodiments, the secondary surfactant of the alcohol ether of ethylene oxide is not needed. In some preferred embodiments, a primary alcohol may be used instead of the secondary alcohol.

Polyethylene Glycol is preferably 300 Daltons in molecular weight in the final formulation.

The present invention is able to achieve a higher solids oil-in-water emulsion that is stable at both room temperature and elevated temperatures (such as around 40-60° C., preferably around 50° C.), pH of 7-10.5 (preferably, pH is 8-10), viscosity range of 1-10,000 cps (preferably, it is around 200-5000 cps, preferably with solids influencing the viscosity), good hand shear, contact angle with water being over 90° with no staining, and sebum contact angle over 90° with no staining A preferred composition formulation comprises:
a natural wax, polyethylene glycol (PEG), alcohol, at least one surfactant, and a neutralizing agent.

Preferably, the natural wax is rice bran wax (RBX). However, other natural, petroleum, and synthetic waxes such as white beeswax, yellow beeswax, cetyl palmitate, carnauba wax, beeswax, lanolin wax, Chinese insect waxes, rice wax, candelilla wax, ouricury wax, esparto wax, cork fibre wax, sugarcane wax, Japan wax, sumac wax, montan wax, microcrystalline waxes, paraffin waxes and ozokerite, polyethylene waxes, and waxes obtained by the Fischer-Tropsch process could also be used. Preferably, the composition of the present invention is 20-60% natural wax; more preferably, it is 40-55% natural wax; most preferably it is 40-55% rice bran wax.

Preferably, the PEG has a molecular average weight up to 10,000 Daltons. More preferably, the PEG has a molecular average weight of 50-10,000 Daltons. Most preferably, the PEG has a molecular average weight of 300 Daltons. Preferably, the composition of the present invention is 0.1-10% PEG. More preferably, it is 3% PEG.

Preferably, the composition of the present invention is 0.1-10% alcohol. More preferably, it is 1% alcohol.

Preferably, the composition of the present invention comprises at least one surfactant. Preferably the composition of the present invention comprises 0.1-10% surfactant, more preferably 3% surfactant. More preferably, the composition of the present invention comprises at least two surfactants. Preferably, these two surfactants are C12-C14 Pareth-40 surfactant and C8-C10, ethoxylated propoxylated surfactant.

Preferably, the present invention contains 0.1-10% neutralizing agent. More preferably, the present invention contains 0.25-1.0% neutralizing agent. Preferably, the neutralizing agent is an alkaline agent. More preferably, it is ammonium hydroxide.

Preferably, the rest of the composition is water.

In some preferred embodiments, the water and emulsifier package (PEG and both surfactants) is blended and then the solution is preferably heated to 180° F.-210° F. (82° C.-99° C.). More preferably, the solution is heated to 190° F. (88° C.). Then, the neutralizing or alkaline agent is preferably added while the formulation is heated, preferably in a hood. Preferably, once the formulation reaches the desired temperature, the natural wax is added. The formulation is preferably mixed for 30 minutes to 120 minutes between 190° F.-210° F. (82° C.-99° C.) to allow the natural wax to melt and to emulsify.

In some preferred embodiments, after the formulation has been fully blended and is in a homogenous phase, the formulation is then preferably homogenized, preferably at 1000-3000 psi (6.9-20.7 Mpa), more preferably at 2000 psi (13.8 Mpa) in a homogenizer. This additional step is not necessary for the composition stability, but it provides a more consistent range of particle size. After homogenization, the emulsion is preferably cooled to room temperature and filtered, preferably through a 100-300-micron filter. The product has been tested for stability for one year at ambient temperature and 50° C. without changing characteristics. We anticipate that continued tests at these temperatures will show continued stability.

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An oil-in-water emulsion composition comprising a solids portion and an aqueous phase, wherein the aqueous phase comprises an emulsifying package, and a neutralizing agent, and wherein the solids portion comprises a wax, wherein the wax is 20-60% by weight of the oil-in-water emulsion, and is a naturally derived, renewable resource, and has a melting point between 49-100° C. and a saponification value of above 20 mg KOH/g, and wherein the emulsifying package comprises polyethylene glycol (PEG) of molecular weight 150-500.

2. The composition of claim 1 wherein the wax is rice bran wax.

3. The composition of claim 1 wherein the emulsifying package further comprises at least two nonionic surfactants.

4. The composition of claim 3 wherein one of the at least two surfactants is an alcohol ether of ethylene oxide propylene oxide surfactant which contains saturated C8-C10 carbon chains with moles of ethoxylated and propoxylated chains.

5. The composition of claim 1 wherein the wax is derived from free fatty acids and alcohols and the neutralizing agent is any agent to neutralize the free fatty acids and alcohols.

6. The composition of claim 5 wherein the neutralizing agent comprises a base which includes potassium hydroxide, sodium hydroxide, and/or amines such as ammonia, ethyl amines, ethanolamine, isopropylamines, and other amine derivatives in a weight amount of 0.25-5% of the oil-in-water emulsion.

7. The composition of claim 1 wherein the emulsifying package further comprises an alcohol ether and a secondary alcohol ethoxylate, the secondary alcohol ethoxylate containing a secondary chain whose length is approximately 41 moles of ethylene oxide.

8. A method of preparing an oil-in-water emulsion composition of claim 1, the method comprising the following steps:
(a) mixing the aqueous phase comprising the emulsifying package and the neutralizing agent;
(b) heating the mixture of step (a) to above a melting point of the wax of step (c);
(c) blending the heated mixture of step (b) with the wax to form a new mixture;
(d) maintaining the temperature of the mixture of step (c) until the mixture is fully blended and is dispersed as a blended aqueous mixture.

9. The method of claim 8, further comprising a step after step (d) of:
(e) homogenizing the blended aqueous mixture of step (d).

10. The method of claim 8 wherein the emulsifying package comprises an alcohol ether, polyethylene glycol (PEG), and a secondary alcohol ethoxylate.

11. The method of claim 10 wherein the alcohol ether is an alcohol ether of ethylene oxide propylene oxide surfactant.

12. The method of claim 10 wherein the secondary alcohol ethoxylate contains a secondary chain whose length is approximately 30-60 moles of ethylene oxide.

13. The method of claim 8 wherein the aqueous phase is a continuous aqueous phase that is opaque.

14. The method of claim 8 wherein the wax is derived from free fatty acids and alcohols and the neutralizing agent is any agent to neutralize the free fatty acids and alcohols.

15. The method of claim 14 wherein the neutralizing agent is comprised of ammonium hydroxide in a weight amount of 0.1-10% of the oil-in-water emulsion.

* * * * *